United States Patent
Mehmedovic et al.

(10) Patent No.: US 11,022,180 B2
(45) Date of Patent: Jun. 1, 2021

(54) HOLDING DEVICE FOR APPLICATION OF A SEALING ELEMENT ON A SHAFT

(71) Applicant: Roplan Holding AB, Tumba (SE)

(72) Inventors: Rifet Mehmedovic, Tumba (SE); Henrik Nedlich, Sundbyberg (SE); Pedram Azadrad, Tullinge (SE)

(73) Assignee: Velcora Holding AB, Årsta (SE)

(*) Notice: Subject to any disclaimer, the term of this patent is extended or adjusted under 35 U.S.C. 154(b) by 214 days.

(21) Appl. No.: 15/779,624

(22) PCT Filed: Nov. 28, 2016

(86) PCT No.: PCT/SE2016/051175
§ 371 (c)(1),
(2) Date: May 29, 2018

(87) PCT Pub. No.: WO2017/099647
PCT Pub. Date: Jun. 15, 2017

(65) Prior Publication Data
US 2018/0372160 A1   Dec. 27, 2018

(30) Foreign Application Priority Data
Dec. 11, 2015  (SE) .................................. 1551628-9

(51) Int. Cl.
*F16J 15/34* (2006.01)
*F16D 1/096* (2006.01)

(52) U.S. Cl.
CPC .......... *F16D 1/096* (2013.01); *F16J 15/3464* (2013.01); *F16J 15/3468* (2013.01); *F16D 2300/08* (2013.01)

(58) Field of Classification Search
CPC ...... F16J 15/34; F16J 15/3436; F16J 15/3464; F16J 15/348
See application file for complete search history.

(56) References Cited

U.S. PATENT DOCUMENTS

| | | | | |
|---|---|---|---|---|
| 2,222,779 A | * | 11/1940 | McHugh | F16J 15/3464 277/397 |
| 2,758,856 A | * | 8/1956 | Payne | F16J 15/36 277/392 |
| 3,198,530 A | * | 8/1965 | Conklin | F16J 15/38 277/395 |

(Continued)

FOREIGN PATENT DOCUMENTS

| | | |
|---|---|---|
| DE | 9011145 U1 | 10/1990 |
| SE | 531 210 C2 | 1/2009 |
| WO | 2008/136757 A1 | 11/2008 |

OTHER PUBLICATIONS

International Search Report and Written Opinion for corresponding Patent Application No. PCT/SE2016/051175 dated Jan. 27, 2017.

*Primary Examiner* — Kristina R Fulton
*Assistant Examiner* — L. Susmitha Koneru
(74) *Attorney, Agent, or Firm* — Renner, Otto, Boisselle & Sklar, LLP

(57) ABSTRACT

The claimed invention concerns a holding device for application of a sealing member (21) on a shaft (23). The holding device (22) includes a connecting mechanism (26, 27) adapted to connect the sealing member (21) on the shaft (23). The connecting mechanism includes an annular body (24) that comprises an inner surface (24a) which, in an axial direction, is arranged at gradually decreasing radial distance from the shaft (23). The connecting mechanism comprises at least a clamping element (26) arranged in a space between the inner surface (24a) of the annular body and the shaft (23), and a displacement mechanism (27) adapted to displace the clamping member in said axial direction relative to the annular body (24) to a position in which the inner surface (24a) of the annular body presses the clamping element to the shaft. The claimed invention also relates to a mechanical sealing device including such a holding device and a hydrodynamic machine having such a mechanical sealing device for applying a sealing member on a shaft.

12 Claims, 2 Drawing Sheets

(56) References Cited

U.S. PATENT DOCUMENTS

| | | | | | |
|---|---|---|---|---|---|
| 3,244,425 | A * | 4/1966 | Wilkinson | ............... | F16J 15/38 277/390 |
| 3,511,510 | A * | 5/1970 | Lindeboom | .............. | F16J 15/38 277/388 |
| 3,601,412 | A * | 8/1971 | Malmstrom | ......... | F16J 15/3456 277/402 |
| 3,642,289 | A * | 2/1972 | Basham | ................... | F16J 15/46 277/638 |
| 3,702,704 | A * | 11/1972 | Bloch | .................... | F16J 15/406 277/430 |
| 4,509,773 | A * | 4/1985 | Wentworth | ........... | F04D 29/126 277/380 |
| 5,344,164 | A * | 9/1994 | Carmody | ............ | F16J 15/3472 277/371 |
| 5,370,401 | A * | 12/1994 | Sandgren | ............. | F16J 15/3488 277/306 |
| 5,505,465 | A * | 4/1996 | Hornsby | .............. | F16J 15/3464 277/374 |
| 5,695,297 | A * | 12/1997 | Geib | ....................... | F16B 7/149 403/369 |
| 6,457,720 | B1 * | 10/2002 | London | ................ | F16J 15/3488 277/370 |
| 6,695,315 | B1 | 2/2004 | Anderberg | | |
| 6,761,359 | B2 * | 7/2004 | Azibert | ................ | F16J 15/3404 277/370 |
| 2002/0089123 | A1 * | 7/2002 | Azibert | ................ | F16J 15/3404 277/370 |
| 2002/0090258 | A1 * | 7/2002 | Lewis | ................... | F16H 57/025 403/374.3 |
| 2008/0309013 | A1 * | 12/2008 | Taheri Oskouei | ... | F16J 15/3404 277/307 |
| 2010/0254840 | A1 | 10/2010 | Nedlich | | |
| 2015/0123349 | A1 * | 5/2015 | Cox | ..................... | F16J 15/3436 277/390 |

* cited by examiner ured States US 11,022,180 B2

HOLDING DEVICE FOR APPLICATION OF A SEALING ELEMENT ON A SHAFT

This application is a national phase of International Application No. PCT/SE2016/051175 filed Nov. 28, 2016 and published in the English language, which claims priority to Swedish Patent Application No. 1551628-9 filed Dec. 11, 2015, which are hereby incorporated herein by reference.

BACKGROUND OF THE INVENTION AND PRIOR ART

The present invention relates to a holding device for application of a sealing element on a shaft according to the preamble of claim 1.

The holding device can be comprised in a mechanical sealing device which may be arranged in a hydrodynamic machine such as a pump. In this case, the mechanical sealing may have the task to seal a space between a rotatable shaft and a housing. Such a mechanical sealing device may comprise a non-rotatable sealing element which is attached in the housing and a rotatable sealing element which is attached on the rotatable shaft. The sealing elements comprise sealing surfaces having a high degree of evenness such that they also at mutual rotation provide a very reliable sealing. Pumps provided with mechanical sealing devices may be used to transport foodstuffs and medicines. However, there are high hygienic requirements on components that come in contact with foodstuffs and medicines. Consequently, it is important that such components are easy to clean and that they do not comprise unevennesses or recesses where foodstuffs and medicines can get stuck.

SE 531 210 shows a mechanical sealing device for a pump where a sealing element is attached on a rotatable shaft by means of an annular body. The annular body is attached on the shaft by means of a radially inwardly projecting portion which is received in a correspondingly shaped recess in the shaft surface. Thus, the annular body and the sealing element obtain a reliable attachment on the shaft. However, such an attachment is not suitable to use in case the pump should transport foodstuffs.

SUMMARY OF THE INVENTION

The object of the invention is to provide a holding device by which it is possible to attach a sealing element on a shaft in a relative simple and reliable manner without cutting of the surface of the shaft.

This object is achieved with the holding device according to claim 1. By providing the annular body with an inclined inner surface in relation to the shaft, it requires a relatively small force by the displacement mechanism to displace the clamping element in an axial direction to a position where it is clamped on the shaft. The clamping element is designed as a segment of a ring and the segment comprises an inner surface having a corresponding curved form as an outer surface of the shaft. Thus, the clamping element may be adapted to the inner surface of the annular body and the shaft surface in an optimal manner. Consequently, a relatively large contact area is also obtained between the clamping element and the shaft. The pressure force transmitted from the clamping element to the shaft may thus be distributed over the entire contact area which reduces the risk for stress concentrations and deformations of said surfaces. The annular body and the sealing element which is connected to the annular body will thus rotate with the shaft as a unit. Since the annular body is attached on the shaft with a clamping force, no recesses or other cuttings are required in the shaft surface for attaching the sealing element on the shaft. Thus, the shafts may have a completely even surface which is easy to clean. Advantageously, the holding device can thus be used in the food industry and the pharmaceutical industry where the hygiene requirements are high.

According to an embodiment of the invention, the clamping element comprises an outer surface having a corresponding shape as the inner surface of the annular body. Thus, a relatively large contact area is obtained between the annular body and the clamping element. The pressure force which is transmitted from the annular body to the clamping element is thus distributed over the entire contact area which reduces the risk for stress concentrations and deformations of said surfaces.

According to an embodiment of the invention, the holding device comprises a plurality of attachment devices which are arranged at constant intervals around the shaft. The holding device may thus comprise two or several clamping elements in the form of segments of a ring which are symmetrically arranged around the shaft. Thus, the pressure forces from the respective clamping elements may be distributed in an optimally manner on the shaft. However, the attachment devices may be arranged asymmetrically around the shaft.

According to an embodiment of the invention, the displacement device comprises a screw element having an extension in an axial direction, wherein the screw element comprises a threaded portion to be engaged with a threaded portion of the clamping element and a head portion which is rotatably arranged in the annular body. In this case, the head portion of the screw element may be turned by means of a suitable tool. The turning motion of the screw element results in that its threaded portion displaces the clamping element in an axial direction in relation to the annular body. Thus, the clamping element may in a simple manner and reliable manner be displaced to a position where it is pressed with a relatively great force against the shaft. However, it is possible to design the displacement device, which displaces the clamping element, in other ways.

According to an embodiment of the invention, the annular body comprises a radially inwardly directed portion. Such a radially inwardly directed portion may have many functions. The radially inwardly directed portion may comprise at least one through hole for application of the head portion of the screw element. Such a through hole has a somewhat elongated shape in a radial direction such that the screw element can be displaced radially inwardly together with the clamping element in connection with the application of the annular body on the shaft.

Alternatively or in combination, the radially inwardly directed portion may comprise at least one through hole for application of a spring element which is adapted to act with an axially directed force on the sealing element. The task of the spring element is to press the sealing surface of the sealing element against a sealing surface of another sealing element.

Alternatively or in combination, the radially inwardly directed portion may comprise at least one through hole for application of an elongated axially directed locking element of the connection mechanism which connects the annular body with the sealing element. Such a connection mechanism allows a certain axial mobility of the sealing element in relation to the annular body at the same time as it prevents rotation between the sealing element and the annular body such that they rotate as a unit.

According to an embodiment of the invention, the annular body comprises, at a first end, a first sealing element which provides a sealing between a surface of the annular body and a radially outer surface of the sealing members and, at a second end, a second sealing member which provides a sealing between a surface of the annular body and the shaft surface. The sealing members prevent thus leakage at the ends of the annular body at the same time as they prevent penetration of possible impurities.

According to an embodiment of the invention, the holding device comprises a mechanical sealing device where said sealing element comprises a sealing surface which is adapted to abut sealingly against a sealing surface of a further sealing element in a radial plane through the shaft. Advantageously, the holding device may thus be comprised in a mechanical sealing device. Advantageously, the mechanical sealing device may be arranged in a space between the shaft and a connecting component which are rotatably arranged in relation to each other. The connecting component may be a housing of a hydrodynamic machine in the form of a pump.

BRIEF DESCRIPTION OF THE DRAWINGS

In the following, a preferred embodiment of the invention is described as an example with reference to the drawings on which.

DETAILED DESCRIPTION OF A PREFERRED EMBODIMENT OF THE INVENTION

Figure 1:
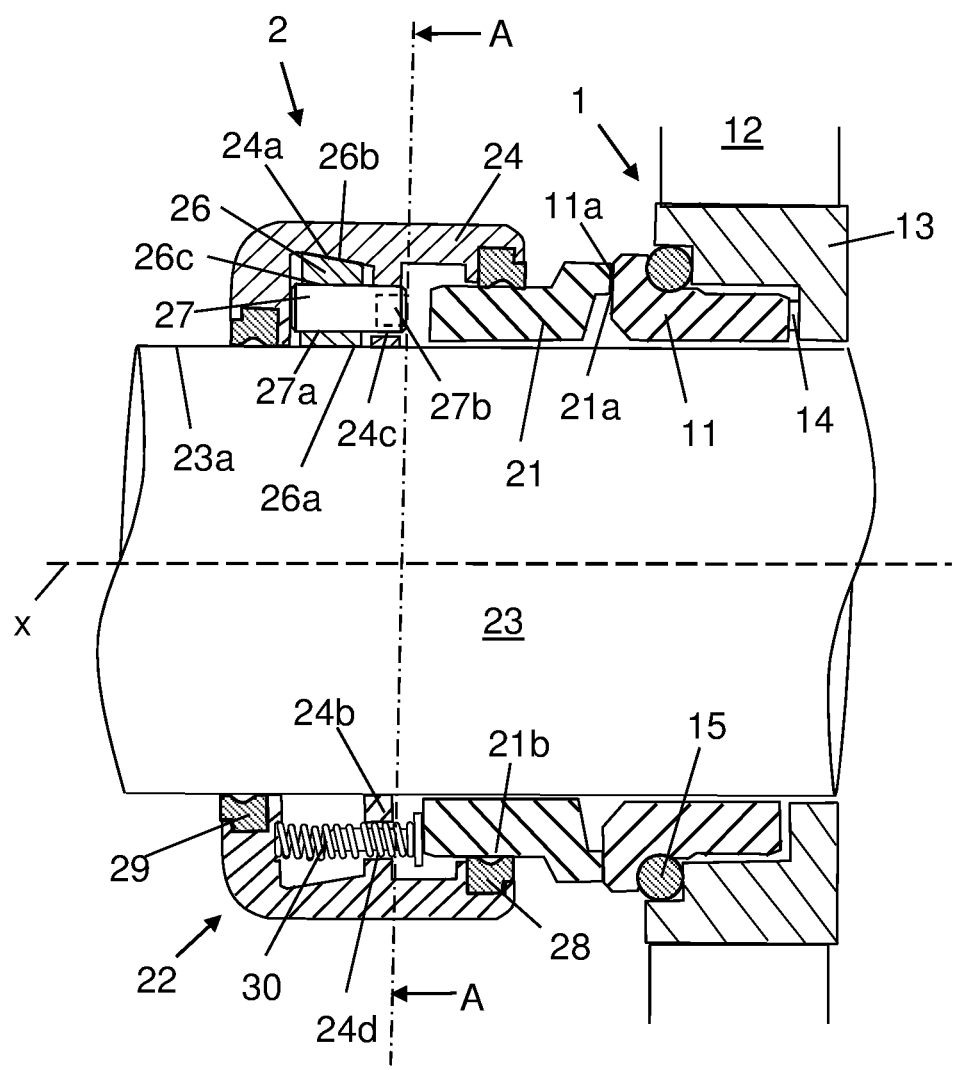
FIG. 1 shows an elongated cross sectional view of a mechanical sealing device which comprises a holding device according to the present the invention.

FIG. 1 shows a mechanical sealing device comprising a first part 1 and a second part 2. In the shown embodiment, the mechanical sealing device in comprised in a pump. The mechanical sealing device may also be used in other applications comprising a rotatable shaft which extends through a passage in a housing or the like, for example, a mixer or a stirrer. In the shown embodiment, the first part 1 is stationary while the second part 2 rotates around a rotation axis x. It is to be noted that the first part 1 can be rotatable and the second part 2 can be stationary or substantially stationary. It is also possible to let the first part 1 and the second part 2 rotate at different rotation speeds.

The first part 1 comprises a first annular sealing element 11. The first sealing element 11 is attached in a housing 12 by means of a first holding device 13. The first the holding device 13 may be connected to the housing 12 by means of a thread engagement. A schematically shown first connection mechanism 14 connects the sealing element 11 and the holding device 13 in a manner such that rotation of the first the sealing element 11 in relation to the holding device 13 is prevented. A sealing member in the form of an O-ring 15 is arranged around the first the sealing element 11 in order to prevent leakage between the first the sealing element 11 and the first the holding device 13. The first sealing element 11 comprises a first plane sealing surface 11a.

Figure 3:
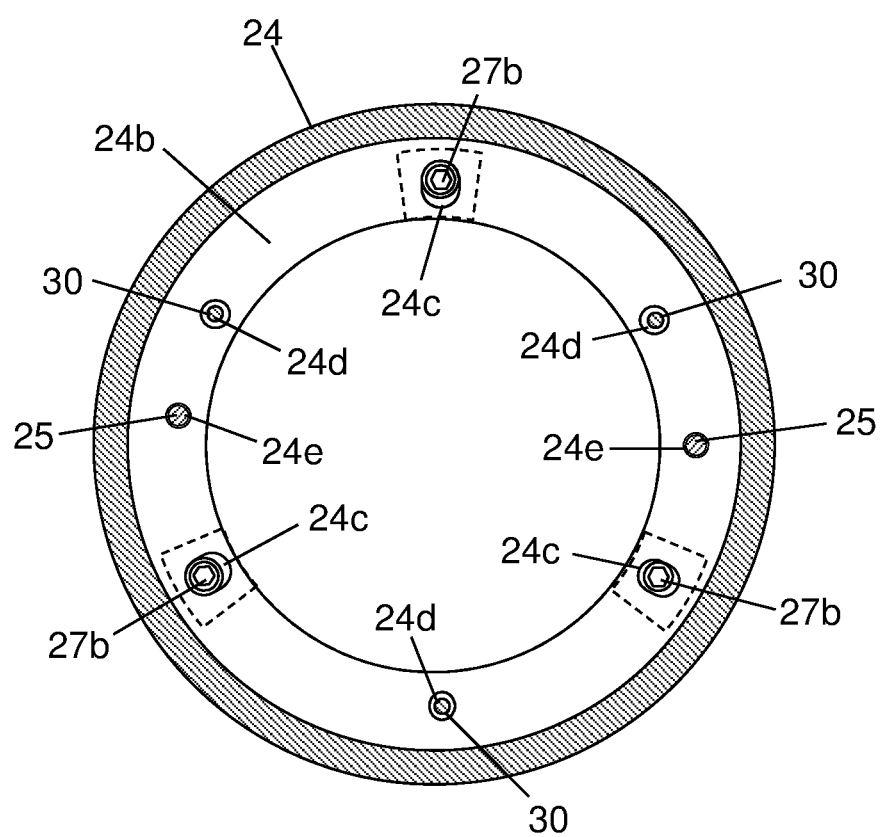

The second part 2 comprises a second sealing element 21. The second sealing element 21 comprises a second plane sealing surface 21a which is adapted to abut against the first sealing surface 11a in a radial plane in relation to the rotation axis x. The sealing surfaces 11a, 21a have each a very high degree of evenness such that they abut sealingly against each other also when the sealing surfaces 11a, 21a are rotated in relation to each other. The second part 2 comprises a second holding device 22 which is adapted to attach the second sealing element 21 on a rotatable shaft 23 which is rotatably arranged around the rotation axis x. The second holding device 22 comprises an annular body 24 which is arranged around the shaft 23. A second connection mechanism 24e, 25, which only is shown in FIG. 3, connects the annular body 24 with the second sealing element 21 in a manner such that the second sealing element 21 is axially displaceable along the rotation axis x in relation to the rotatable shaft 23, but it is fixedly connected to the rotatable shaft 23 in a periphery direction. The annular body 24 and the second sealing element 21 thus rotates as a unit.

The second holding device 22 comprises at least one but preferably a plurality of attachment devices which each comprises a clamping device 26 and a screw element 27. The attachment devices are in this case arranged in different positioner at regular intervals around the shaft 23. The clamping elements 26 are arranged in a periphery space between an inner surface 24a of the annular body 24 and a surface 23a of the shaft 23. Each of the clamping elements 26 comprises an inner surface 26a having a corresponding shape as the shaft surface 23a. Each one of the clamping elements 26 comprises an outer surface 26b having a corresponding shape as inner surface of the annular body 24a. The outer surface 26b of the clamping elements 26 and an inner surface of the annular body 24a are provided with an inclination in an axial direction in relation to the shaft 23. Each one of the clamping elements 26 comprises a thread through hole 26c. A threaded portion 27a of a screw element 27 is arranged in the through hole 26c. The screw element 27 comprises, at an end, a head portion 27b with a gripping recess in order to enable turning of the screw element 27 by a tool. The head portion 27b of the screw element 27 is arranged in a through hole 24c of a radially inwardly protruding part 24b of the annular body 24. The through hole 24c has a certain radial extension such that the screw element 27 has a corresponding mobility in a radial direction.

A first sealing member 28 is adapted to seal between a surface of a first end of the annular body 24 and an outer surface 11b of the second sealing element 11. A second sealing member 29 is adapted to seal between a surface of a second end of the annular body 24 and the shaft surface 23a. The second holding device 22 comprises at least one but preferably a plurality of spring elements 30 which may be arranged at regular intervals around the shaft 23. The tensioning elements 30 comprise spring members which in a mounted state supply a spring force on the second sealing element 21 such that it is pressured against the first sealing element 11 which results in that the sealing surfaces 11a, 21a are kept together with a predetermined force.

Figure 2:
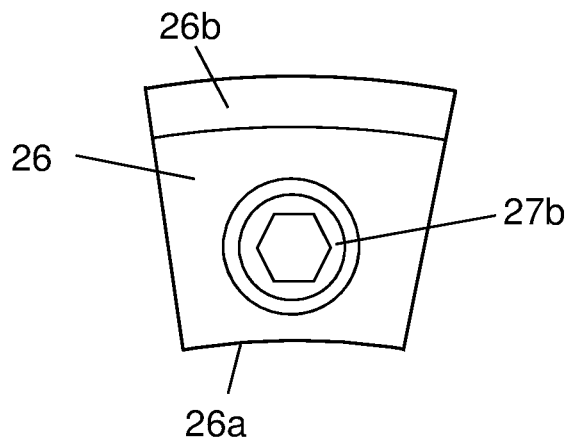
FIG. 2 shows a front view of the clamping element in a separated state and FIG. 3 shows a cross sectional view in the plane A-A in FIG. 1.

FIG. 2 shows a front view of a clamping element 26. The clamping element 26 is designed as a segment of a ring. The clamping element 26 has an inner surface 26a with a curvature in a radial plane. Advantageously, the shaft surface 23a has a corresponding curvature. The clamping element 26 has an outer surface 26b with a curvature in a radial plane. Advantageously, the inner surface 24a of the annular body 24 has a corresponding curvature. It is here also apparent that the head portion 27b of the screw element is provided with a gripping recess for a tool.

FIG. 3 shows a cross sectional view in plane A-A in FIG. 1. In this embodiment, the inwardly directed portion 24b of the annular body comprises three through holes 24c for receiving of a respective head portion 27b of a screw element 27. The screw elements 27 and the clamping elements 26 are here arranged at constant intervals around the periphery of the shaft 23. The inwardly directed portion 24b comprises three through holes 24d for receiving of a through spring element 30 which exerts an axial pressure force on the second sealing element 21. The holes 24d and the spring elements 30 are arranged with constant intervals around the periphery of the shaft 23. The inwardly directed portion 24b comprises two through holes 24e for receiving of a respective elongated axial locking element 25 which is attached on the second sealing element 21. When the locking elements 25 are applied in the through holes 24e, mutual rotation between the second sealing element 21 and the annular body 24 is prevented. However, a certain axial mobility is allowed between the second sealing element 21 and the annular body 24. The number of holes 24c, d, e and its sharing can obviously be varied.

At mounting of the mechanical sealing device, the second holding device 22 is initially applied on the shaft 23. The second holding device 22 comprises the annular body 24, the clamping elements 26, the screw element 27, the sealing members 28, 29 and the spring element 30. The holding device 22 is displaced to a predetermined axial position on the shaft 23. By means of a screw tool, the respective screw elements 27 are in proper order given a turning motion such that the respective clamping elements 27 are displaced in a direction to the right in FIG. 1. The downwardly inclined inner surface 26a of the annular body 26 thus presses the respective clamping elements 26 and screw elements 27 radially inwardly in direction towards the shaft 23. Consequently, the inner surface 26b of the respective clamping elements is pressured with a successively increasing pressure force against the periphery surface 23a of the shaft. The screw motion of the screw element 27 is stopped when a predetermined pressure force is achieved. The through holes 24c may be dimensioned such that the screw element 27 reaches a radially inwardly surface of the hole 24c as the predetermined pressure force is achieved. When all clamping elements 26 have been applied with a predetermined clamping force against the periphery surface 23a of the shaft, the holding device 22 has a very stable attachment on the shaft 23. The holding device 22 and the shaft 23 can now rotate as a unit.

Thereafter, the second sealing element 21 is applied on the shaft 23 and displaced in an axial direction to engagement with the annular body 24 at the same time as the locking element 25 is moved through the through holes 24e. A rotation locking is thus provided of the second sealing element 21 in relation to the holding device 22 and the shaft 23. The first part 1 of the mechanical sealing device is applied on the shaft 23 and displaced in an axial direction towards the second part 2. The first part 1 is displaced to an axial position in which the spring element 30 provides a predetermined force which pressures the sealing surfaces 11a, 21a of the sealing elements 11, 21 against each other. Finally, the first the holding device 13 is attached in the housing 12.

The invention is not restricted to the embodiments shown but may be varied and modified within the scope of the following claims.

The invention claimed is:

1. In combination, a shaft, a sealing element, and a holding device for application of the sealing element on the shaft, wherein the holding device comprises
   an annular body,
   a connection mechanism which is adapted to connect the annular body with the sealing element and at least one attachment device which is adapted to attach the annular body on the shaft,
   wherein the annular body comprises a radial inner surface which, in an axial direction, is arranged as a tapered surface, and that
   the attachment device comprises
     at least one clamping device which has a tapered radial outer surface and is arranged in a space between the radial inner surface of the annular body and the shaft, and
     a displacement device which is adapted to displace the clamping element in said axial direction in relation to the annular body to a position in which an inner surface of the annular body presses firmly the clamping element against the shaft, and wherein the clamping element is formed as a segment of a ring and that the segment comprises an inner surface having a corresponding curved form as an outer surface of the shaft; and
   wherein the annular body has, at a first end, a first annular sealing member which provides a sealing between a surface of the annular body and a radially outer surface of the sealing element and, at a second end, a second annular sealing member which provides a sealing between a surface of the annular body and the shaft surface.

2. The combination according to claim 1, wherein the clamping element comprises the radial outer surface having a corresponding shape as the radial inner surface of the annular body.

3. The combination according to claim 1, wherein the holding device comprises two or several clamping elements in the form of segments of a ring which are symmetrically arranged around the shaft in a radial plane.

4. The combination according to claim 1, wherein the holding device comprises attachment devices which are arranged at constant intervals around the shaft.

5. The combination according to claim 1, wherein the displacement device comprises a screw element having an extension in an axial direction, wherein the screw element comprises a threaded portion to be engaged with a threaded portion of the clamping element and a head portion which is rotatably arranged in the annular body.

6. The combination according to claim 1, wherein the annular body comprises a radially inwardly directed portion.

7. The combination according to claim 5, wherein the radially inwardly directed portion comprises at least one through hole for application of a head portion of the screw element.

8. The combination according to claim 6, wherein the radially inwardly directed portion comprises at least one through hole for application of a spring element which is adapted to act with an axially directed force on the sealing element.

9. The combination according to claim 6, wherein the radially inwardly directed portion comprises at least one through hole for application of a locking element of the connection mechanism which connects the annular body with the sealing element.

10. The combination according to claim 1, wherein said sealing element comprises a sealing surface which is adapted to abut sealingly against a sealing surface of a further sealing element in a radial plane through the shaft.

11. A hydrodynamic machine which comprises a combination according to claim 10, wherein the holding device is arranged in a space between the shaft and a connecting component which are rotatably arranged in relation to each other.

12. The hydrodynamic machine according to claim 11, wherein the hydrodynamic machine is a pump.

* * * * *